April 21, 1925.                                          1,535,014
L. G. ANDREWS
AUTO SIGNAL
Filed April 18, 1922
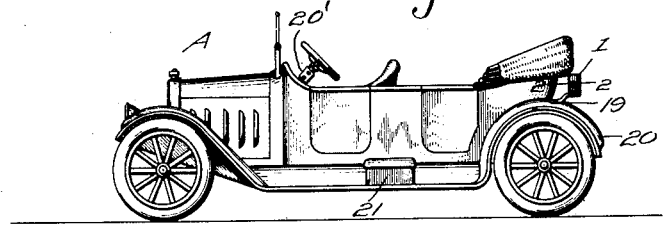
Fig. 1.
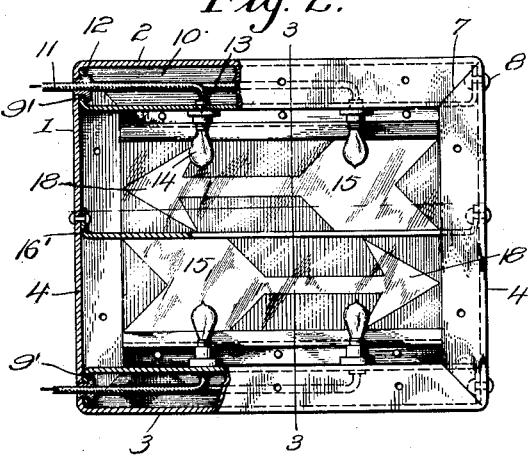
Fig. 2.
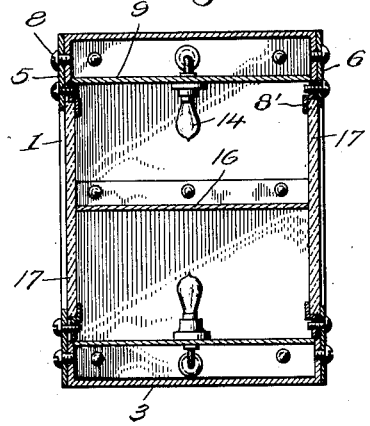
Fig. 3.
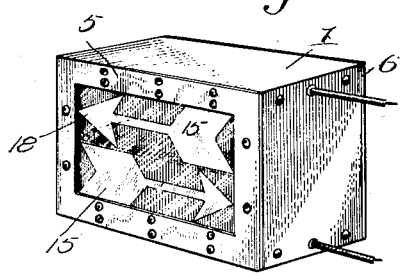
Fig. 4.
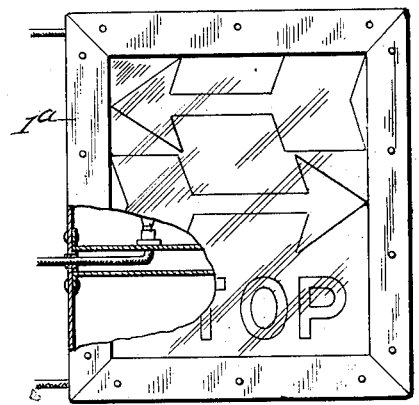
Fig. 6.
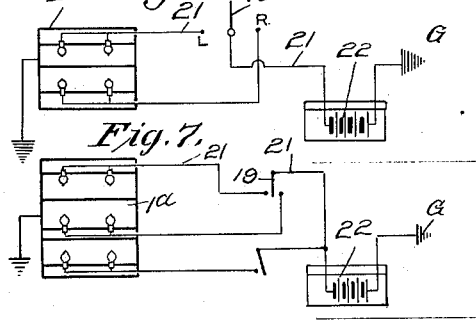
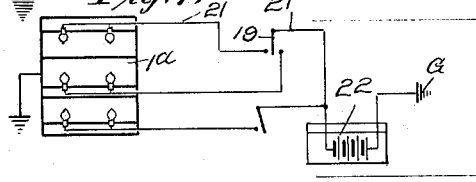
Fig. 5.
Fig. 7.
L. G. Andrews
INVENTOR.
BY Geo. P. Kimmel
ATTORNEY.

Patented Apr. 21, 1925.

1,535,014

UNITED STATES PATENT OFFICE.

LESLIE G. ANDREWS, OF LINCOLN, NEBRASKA.

AUTO SIGNAL.

Application filed April 18, 1922. Serial No. 555,177.

*To all whom it may concern:*

Be it known that I, LESLIE G. ANDREWS, a citizen of the United States, residing at Lincoln, in the county of Lancaster and State of Nebraska, have invented certain new and useful Improvements in Auto Signals, of which the following is a specification.

This invention has reference to automobile signal lights and its object is to provide a structure which may be attached to a portion of the body of the automobile, say one of the fenders, so as to be visible from either the front or the rear portion of the automobile and permit the operator of the automobile to produce signals which will apprise an automobile driver, at night, of the intended course, to the right or left, which the driver will take.

The invention contemplates the use of a weather-proof casing having panes of glass therein with electric lights housed in the casing and with controlling devices so that the electric lights may be energized in a manner to illuminate signal indicia, at the will of the operator, to warn the vehicle approaching or approached by the vechile to be warned that the vehicle displaying the signal is to turn to the right or left or is to be otherwise controlled, so that accidents may be avoided.

The invention comprises a casing, which may be made of metal, because of its opaque characteristics and because of its water-proof form, permitting the location of the casing where it may be subjected to the action of the elements without harm.

The front and rear panels of the casing are formed of glass so that light may be transmitted through them, and by the use of an opaque paint which may be in part transparent, suitable indica are producible by the use of electric lights to give the desired signals. With the signal devices caused by appropriate paints or tints, the indica may be viewed from either the front or from the rear of the travelling vechicle and the casing may be in the form of a two-story device each with electric lights and with oppositely directed indicia so that on energizing one or the other of the lights, the intended direction of travel may be readily controlled.

The casing may be in the form of opposite- ly placed frames, spaced by partitions from the top and bottom of the casing and also provided with an intermediate frame so that there is no light interference between the upper and lower compartments into which the casing is divided, and the spaces between the upper and lower compartments and the top and bottom of the casing provide for the housing of the conductors feeding the electric lamps employed for illuminating the signal device.

Such signal device is conveniently mounted on the steering post of the vehicle or in any other convenient place, and control devices within ready reach of the operator of the vehicle, may be used as desired.

It is the usual practice upon automobiles to utilize storage batteries for energizing electric lamps used in signal devices and for other purposes, and such arrangement is contemplated by the present invention, so that the invention does not mean any great change over other signal devices in which electric current is employed.

The invention will be best understood from a consideration of the following detailed description taken in connection with the accompying drawings, forming part of this specification, with the understanding that the invention is not confined to any strict conformity with the showing of the drawings, but may be changed and modified so long as such changes and modifications mark no material departure from the salient features of the invention as expressed in the appended claim.

In the drawings:—

Figure 1 is a side elevation of an automobile equipped with the invention.

Figure 2 is a view of one face of the signal embodying this invention, a portion of the same being broken away to show a part of the interior construction.

Fig. 3 is a section on the line 3—3 of Fig. 2.

Fig. 4 is a perspective view of the signal box or casing but drawn on a smaller scale than either of Figs. 2 and 3.

Fig. 5 is a diagrammatic view of the electrical connections of the signal box.

Fig. 6 is a view similar to Fig. 2, but elaborated to the extent of showing a stop indicia.

Fig. 7 is a diagram of the electric circuits employed in the structure of Fig. 6.

Referring to Fig. 1, there is shown an automobile A, and, as the invention is not restricted to any particular type of automobile, no attempt is made in Fig. 1 to show any special type of automobile.

In Figs. 2, 3 and 4, there is shown an open casing 1 of generally rectangular form with sheet metal top, bottom and ends 2, 3, and 4, respectively, and there is provided for the front and rear of the casing frame 5 and 6 of open conformation.

The top, bottom and end walls of this casing are formed in one piece and have extending inwardly therefrom integral flanges 7, which form open frames in each side of the casing. Secured upon the surface of each of these flanges by means of screws 8, is one of the frames 5 or 6 which frames are of greater width than the flanges 7, as clearly shown in Fig. 3.

Secured to the inner surface of the frame 5 and 6 are a series of spaced angle clips 8', by which the insignia bearing transparent elements are held in position against the inner face of the frame.

Interiorly of the casing are partitions 9—9 and 16, each having their ends formed at right angles to provide attaching means 9' and 16', for connection with the end walls of the casing. As shown, the partition 16 extends through the central part of the casing, while the partitions 9—9 are located near the top and bottom walls of the casing, forming a narrow chamber 10 at the top and bottom sides of the casing. Extending through the end walls of each of the chambers 10 is a plug 12 having a passage therethrough, by which passage electric wires 11 are passed into the chamber to feed lamps 14 carried by the partitions 9, and located in the chamber formed between the lamp carried partition and the centrally positioned partition 16. This chamber 10 serves as a protecting housing for the wires 11.

Produced upon the inner surface of the glass panes 17 are insignia indicated at 18, which insignia may be of an index character, such as a showing of an arrow, although by no means confined to such particular insignia. The partition 16, serves to separate the upper and lower insignia so that the lighting of the upper lamps will illuminate only the upper insignia, and the lighting of the lower lamps will illuminate only the lower insignia.

The casing 1 may be conveniently mounted upon a bracket 19 erected on a fender 20 belonging to the automobile body, the mounting being of such character as to permit rays of light issuing from the casing 1 to be directed toward either the front or the rear of the automobile according to the will of the operator, and in so issuing one or the other of the indicia 18 becomes visible to an observer at either the front or the rear of the automobile.

In this manner, the observer having been approached by an automobile from the rear or the front, becomes apprised of the intended course of the automobile carrying the light signal and may shape his course accordingly, whereby liability of accident is reduced to a minimum.

The lamps 14 of the signal device, are under the control of a switch arm 19, which may be conveniently mounted upon the steering post 20' of the automobile within easy reach of the operator of the automobile. The switch arm 19 is arranged within the path of electric conductors 21 coupled to a battery 22, illustrated in the drawing as a storage battery because such storage battery is usually included in the equipment of an automobile, and hence needs no particular description herein.

The invention is of a character to permit its installation upon the body of the vehicle in such position as to be visible either from in front of the vehicle or behind the latter and the electrical connections are such that the operator may indicate to the person to be warned as to the intended course of the vehicle whether viewed from in front or from the rear and the course of the observer may be chosen accordingly.

In Fig. 6, there is shown a casing 1ᵃ similar to the casing 1 of Fig. 2, but provided with an additional compartment through the front of which may be observed the indicia "Stop" to warn persons approaching the automobile of the intended purpose of the driver of the vehicle so that appropriate precautions may be taken to avoid accidents.

In Fig. 7 there is shown a diagram similar to that of Fig. 5 but showing the electric circuits employed in the structure of Fig. 6.

What is claimed is:—

An automobile signal of the character described comprising, a substantially rectangular open casing having top, bottom and end walls, right angled integral flanges projecting inwardly from the edges of said walls, an open frame of the same contour of said casing secured to the outer face of, and of greater width than, said flanges, transparent indicia bearing elements secured to said frame, an upper, an intermediate and a lower partitioning element within said casing, the upper and lower elements being spaced respectively from the top and bottom of the casing and coacting with said inwardly projecting flanges to provide a relatively shallow top and bottom chamber and said intermediate element dividing the space between the upper and lower elements to provide a pair of intermediate chambers, said transparent elements forming the side walls of said intermediate chambers, apertured plugs extending through the walls of said shallow chambers, incandescent lighting elements in each intermediate chamber carried by the partition adjacent each shallow chamber, and electrical conductors entering said shallow chambers through said plugs and connected to said incandescent elements.

In testimony whereof, I affix my signature hereto.

LESLIE G. ANDREWS.